US011029774B2

(12) United States Patent
Yang et al.

(10) Patent No.: US 11,029,774 B2
(45) Date of Patent: Jun. 8, 2021

(54) TOUCH PANEL IN WHICH CATHODES SERVE AS TOUCH SENSE ELECTRODES AND A TOUCH SCREEN FORMED USING THE TOUCH PANEL

(71) Applicant: BOE TECHNOLOGY GROUP CO., LTD., Beijing (CN)

(72) Inventors: Shengji Yang, Beijing (CN); Xue Dong, Beijing (CN); Xiaochuan Chen, Beijing (CN); Pengcheng Lu, Beijing (CN); Lei Wang, Beijing (CN); Zhi Wang, Beijing (CN); Weifeng Han, Beijing (CN); Jing Yu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 60 days.

(21) Appl. No.: 16/029,162

(22) Filed: Jul. 6, 2018

(65) Prior Publication Data
US 2019/0095016 A1    Mar. 28, 2019

(30) Foreign Application Priority Data

Sep. 26, 2017    (CN) .......................... 201710882530.7

(51) Int. Cl.
*G06F 3/041*    (2006.01)
*G09G 3/3225*    (2016.01)
(Continued)

(52) U.S. Cl.
CPC .......... *G06F 3/0412* (2013.01); *G06F 3/0443* (2019.05); *G06F 3/04184* (2019.05);
(Continued)

(58) Field of Classification Search
CPC .. G06F 3/0412; G06F 3/0416; G06F 3/04184; G06F 3/0443; G09G 2300/0426;
(Continued)

(56) References Cited

U.S. PATENT DOCUMENTS

2010/0231528 A1*  9/2010  Wolfe .................. G06F 3/0412
                                                  345/173
2010/0295604 A1* 11/2010  Hente ................. H03K 17/955
                                                  327/517
(Continued)

FOREIGN PATENT DOCUMENTS

CN    104835454 A    8/2015
CN    104898887 A    9/2015
(Continued)

OTHER PUBLICATIONS

First Office Action for Chinese Patent Application No. 201710882530.7 dated Mar. 13, 2019.

*Primary Examiner* — Ram A Mistry
(74) *Attorney, Agent, or Firm* — Calfee, Halter & Griswold LLP

(57) ABSTRACT

The present disclosure relates to a touch panel and a touch screen. In the touch panel, the cathode is reused. In the touch control stage, each of the cathodes serves as a touch electrode, and normal display and touch functions of the touch panel can be realized by a time-division driving manner. Specifically, in the display stage, the pixel circuit controls the light emitting state of each pixel point (each pixel point has a light emitting device including a cathode); in the touch control stage, touch control signals are applied onto all control signal terminals of the pixel circuit and the cathodes at the same time. By doing so, on the basis that the touch control function can be realized, the synchronous driving of the touch control electrodes and the electrodes corresponding to the touch control electrodes can be realized.

18 Claims, 5 Drawing Sheets

(51) Int. Cl.
    *G06F 3/044*     (2006.01)
    *G09G 3/3233*     (2016.01)

(52) U.S. Cl.
    CPC ......... *G09G 3/3225* (2013.01); *G09G 3/3233* (2013.01); *G09G 2300/0426* (2013.01); *G09G 2300/0819* (2013.01); *G09G 2300/0842* (2013.01); *G09G 2300/0861* (2013.01); *G09G 2310/061* (2013.01); *G09G 2320/045* (2013.01); *G09G 2354/00* (2013.01)

(58) Field of Classification Search
    CPC ... G09G 2300/0819; G09G 2300/0842; G09G 2300/0861; G09G 2310/061; G09G 2320/045; G09G 2354/00; G09G 3/3225; G09G 3/3233
    See application file for complete search history.

(56) References Cited

U.S. PATENT DOCUMENTS

2016/0133191 A1*   5/2016   Kang ................... G09G 3/3258
                                                              345/212
2017/0153759 A1     6/2017   Ding et al.

FOREIGN PATENT DOCUMENTS

CN         106708339 A     5/2017
CN         106910447 A     6/2017

* cited by examiner

TOUCH PANEL IN WHICH CATHODES SERVE AS TOUCH SENSE ELECTRODES AND A TOUCH SCREEN FORMED USING THE TOUCH PANEL

CROSS-REFERENCE TO RELATED APPLICATIONS

This application claims priority to Chinese Patent Application 201710882530.7, filed Sep. 26, 2017, the entire contents of which are incorporated herein by reference.

TECHNICAL FIELD

The present disclosure relates to display technical field, and in particular, to a touch panel and a touch screen.

BACKGROUND

With the development of display technologies, Organic Light Emitting Display (OLED) becomes one of the hot topics in the field of flat panel display today, and more and more Active Matrix Organic Light Emitting Diode (AMOLED) display panels enter the market. As compared with the conventional Thin Film Transistor Liquid Crystal Display (TFT LCD) panels, the AMOLED has a faster response speed, a higher contrast, and a wider viewing angle.

Currently, display devices are developed to be lighter, thinner, having higher resolution, smarter, and more energy-efficient, and accordingly touch screen panels have become more and more widely used. The touch screen is usually implemented in resistive, capacitive, optical, acoustic wave, and so on. An in-cell touch panel can reduce the overall thickness of the module by inserting the touch component in the display panel, and can greatly reduce the production cost of the touch screen. Thus, the in-cell touch panel becomes favored by major panel manufacturers. The OLED display panels are attracting attention for advantages of low power consumption, high brightness, low cost, wide viewing angle, and fast response speed.

Currently, OLED display products have begun to replace traditional LCD screens in display products such as mobile phones, tablet computers, and digital cameras. The pixel driving circuit design is the core technical content of the AMOLED displays and has important research significance. At the same time, the in cell touch technology, which is facing technical difficulties, is increasingly favored by panel manufacturers in view of its compatibility with display panel processes. Therefore, how to realize the control of touch and display of the OLED display products is an urgent technical problem to be solved by one of ordinary skill in this art.

SUMMARY

An embodiment of the present disclosure provides a touch panel, including:

a plurality of cathodes;

touch wires and touch driving chips individually corresponding to one of the cathodes; and pixel circuits each disposed in one of pixel units, each of which includes a light emitting device having one of the cathodes;

wherein:

in a display stage, each of the pixel circuits is configured to drive the light emitting device to emit light normally under control of control signal terminals; and in a touch control stage, each of the touch driving chip is configured to apply a touch control signal to one of the cathodes through one of the touch wires, and apply a control signal which is the same as the touch control signal to the control signal terminals of one of the pixel circuit.

In a possible implementation, in the touch panel provided by an embodiment of the present disclosure, each of the pixel circuits includes a driver, a writer, a power supply, a reset module, a controller and a compensator; wherein:

a control terminal of the reset module is input with a reset signal, an input terminal of the reset module is input with an initialization signal, and an input terminal of the reset module is connected to a first node; the reset module is configured to, under control of the reset signal, initialize the first node by the initialization signal;

a control terminal of the compensator is input with a scan signal, a first input terminal of the compensator is connected to a second node, a second input terminal of the compensator is input with a power supply signal, and an output terminal of the compensator is connected to the first node; the compensator is configured to, under control of the scan signal, compensate a threshold voltage at the first node;

a control terminal of the driver is connected to the first node, an input terminal of the driver is connected to a third node, and an output terminal of the driver is connected to the second node; the driver is configured to, under control of the first node, make the third node and the second node conducted;

a control terminal of the power supply is input with a light emitting control signal, an input terminal of the power supply is input with the power supply signal, and an output terminal of the power supply is connected to the third node; the power supply is configured to, under control of the light emitting control signal, output the power supply signal to the third node;

a control terminal of the writer is input with the scan signal, an input terminal of the writer is input with a data signal, and an output terminal of the writer is connected to the third node; the writer is configured to, under control of the scan signal, output the data signal to the third node;

a control terminal of the controller is input with the light emitting control signal, an input terminal of the controller is connected to the second node, and an output terminal of the controller is configured to output a driving signal for driving the light emitting device to emit light; the controller is configured to, under control of the light emitting control signal, output a signal at the second node as the driving signal for driving the light emitting device to emit light.

In a possible implementation, in the touch panel provided by an embodiment of the present disclosure, the reset module includes a first switching transistor;

wherein a gate of the first switching transistor is input with the reset signal, a source of the first switching transistor is input with the initialization signal, and a drain of the first switching transistor is connected to the first node.

In a possible implementation, in the touch panel provided by an embodiment of the present disclosure, the compensator includes a second switching transistor and a first capacitor; wherein:

a gate of the second switching transistor is input with the scan signal, a source of the second switching transistor is connected to the second node, and a drain of the second switching transistor is connected to the first node; and a terminal of the first capacitor is input with the power supply signal, and another terminal of the first capacitor is connected to the first node.

In a possible implementation, in the touch panel provided by an embodiment of the present disclosure, the driver includes a third switching transistor;

wherein a gate of the third switching transistor is connected to the first node, a source of the third switching transistor is connected to the third node, and a drain of the third switching transistor is connected to the second node.

In a possible implementation, in the touch panel provided by an embodiment of the present disclosure, the power supply includes a fourth switching transistor;

a gate of the fourth switching transistor is input with the light emitting control signal, a source of the fourth switching transistor is input with the power supply signal, and a drain of the fourth switching transistor is connected to the third node.

In a possible implementation, in the touch panel provided by an embodiment of the present disclosure, the power supply further includes a second capacitor;

wherein the second capacitor is connected between the source and the drain of the fourth switching transistor.

In a possible implementation, in the touch panel provided by an embodiment of the present disclosure, the writer includes a fifth switching transistor;

wherein a gate of the fifth switching transistor is input with the scan signal, a source of the fifth switching transistor is input with the data signal, and a drain of the fifth switching transistor is connected to the third node.

In a possible implementation, in the touch panel provided by an embodiment of the present disclosure, the controller includes a sixth switching transistor;

wherein a gate of the sixth switching transistor is input with the light emitting control signal, a source of the sixth switching transistor is connected to the second node, and a drain of the sixth switching transistor outputs the driving signal for driving the light emitting device to emit light.

An embodiment of the present disclosure provides a touch screen, including the touch panel described above.

This section provides a summary of various implementations or examples of the technologies described in this disclosure, and is not a comprehensive disclosure of all of the features of the disclosed technologies.

DETAILED DESCRIPTION

Hereinafter, embodiments of the touch panel and touch screen of the present disclosure will be described in detail with reference to drawings.

An embodiment of the present disclosure provides a touch panel. The touch panel includes a plurality of cathodes, touch wires and touch driving chips individually corresponding to one of the cathodes, and pixel circuits each disposed in one of pixel units, each of which includes a light emitting device having one of the cathodes. In a display stage, each of the pixel circuits is configured to drive the light emitting device to emit light normally under control of control signal terminals; and in a touch control stage, each of the touch driving chip is configured to apply a touch control signal to one of the cathodes through one of the touch wires, and apply a control signal which is the same as the touch control signal to the control signal terminals of one of the pixel circuit.

In the touch panel provided by the embodiment of the present disclosure, the cathodes are reused. That is, in the touch control stage, each of the cathodes serves as a touch electrode, and normal display and touch functions of the touch panel can be realized by a time-division driving manner. Specifically, in the display stage, the pixel circuit controls the light emitting state of each pixel point (each pixel point has a light emitting device including a cathode); in the touch control stage, touch control signals are applied onto all control signal terminals of the pixel circuit and the cathodes at the same time. By doing so, on the basis that the touch control function can be realized, the synchronous driving of the touch control electrodes and the electrodes opposite to the touch control electrodes can be realized. This can eliminate the coupling voltage difference between electrodes and the touch control electrodes, and thereby counteract the influence of the coupling capacitance on the touch control electrodes and the influence of the touch electrodes on the load directly below the electrode.

Figure 1:
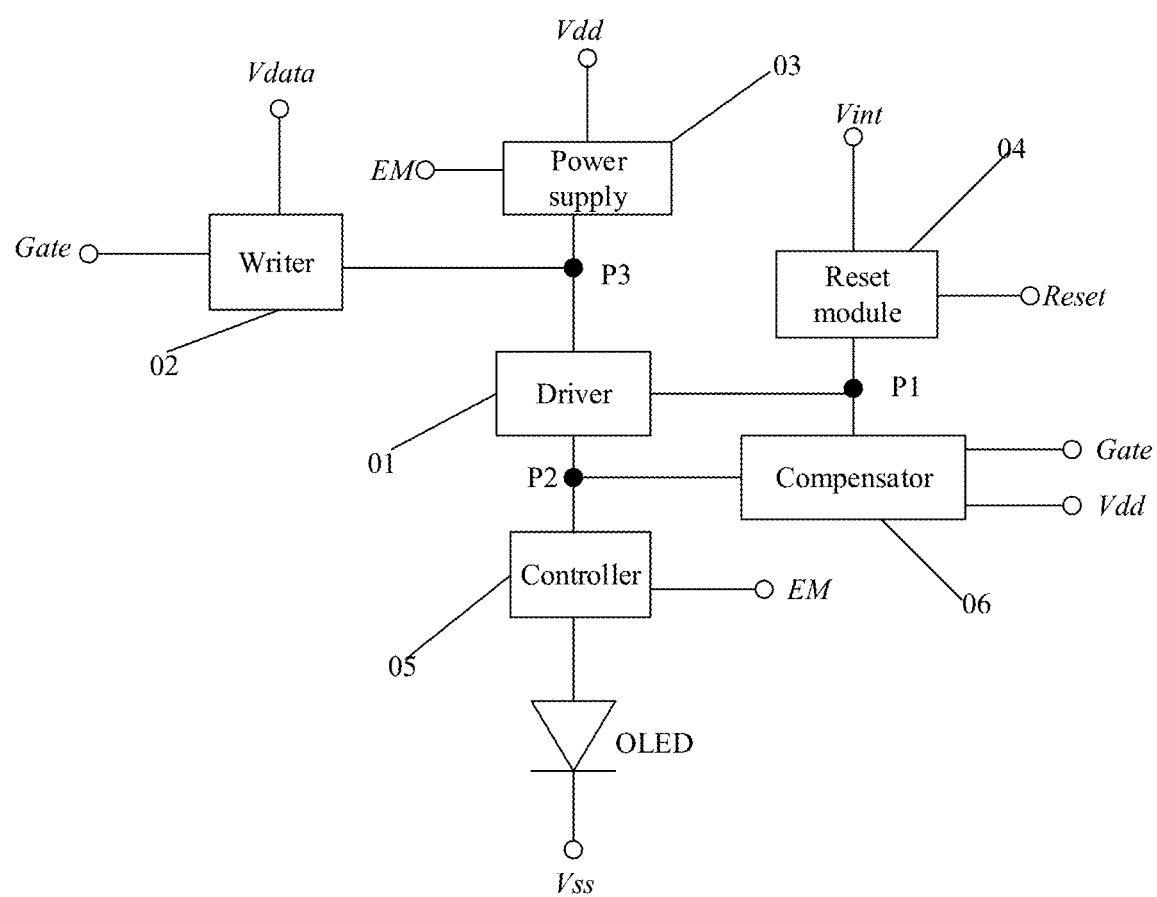
FIG. 1 is a schematic diagram showing a structure of a pixel circuit according to an embodiment of the present disclosure.

Referring to FIG. 1, in a touch panel provided by an embodiment of the present disclosure, the pixel circuit includes a driver 01, a writer 02, a power supply 03, a reset module 04, a controller 05 and a compensator 06.

A control terminal of the reset module 04 is input with a reset signal Reset, an input terminal of the reset module 04 is input with an initialization signal Vint, and an output terminal of the reset module 04 is connected to a first node P1; the reset module 04 is configured to, under control of the reset signal Reset, initialize the first node P by the initialization signal Vint.

A control terminal of the compensator 06 is input with a scan signal Gate, a first input terminal of the compensator 06 is connected to a second node P2, a second input terminal of the compensator 06 is input with a power supply signal Vdd, and an output terminal of the compensator 06 is connected to the first node P1; the compensator 06 is configured to, under control of the scan signal Gate, compensate a threshold voltage at the first node P1.

A control terminal of the driver 01 is connected to the first node P1, an input terminal of the driver 01 is connected to a third node P3, and an output terminal of the driver 01 is connected to the second node P2; the driver 01 is configured to, under control of the first node P1, make the third node P3 and the second node P2 conducted.

A control terminal of the power supply 03 is input with a light emitting control signal EM, an input terminal of the power supply 03 is input with the power supply signal Vdd, and an output terminal of the power supply 03 is connected to the third node P3; the power supply 03 is configured to, under control of the light emitting control signal EM, output the power supply signal Vdd to the third node P3.

A control terminal of the writer 02 is input with the scan signal Gate, an input terminal of the writer 02 is input with a data signal Vdata, and an output terminal of the writer 02 is connected to the third node P3; the writer 02 is configured to, under control of the scan signal Gate, output the data signal Vdata to the third node P3.

A control terminal of the controller 05 is input with the light emitting control signal EM, an input terminal of the controller 05 is connected to the second node P2, and an output terminal of the controller 05 is configured to output a driving signal for driving the light emitting device OLED to emit light; the controller 05 is configured to, under control of the light emitting control signal EM, output a signal at the second node as the driving signal for driving the light emitting device to emit light.

Figure 2:
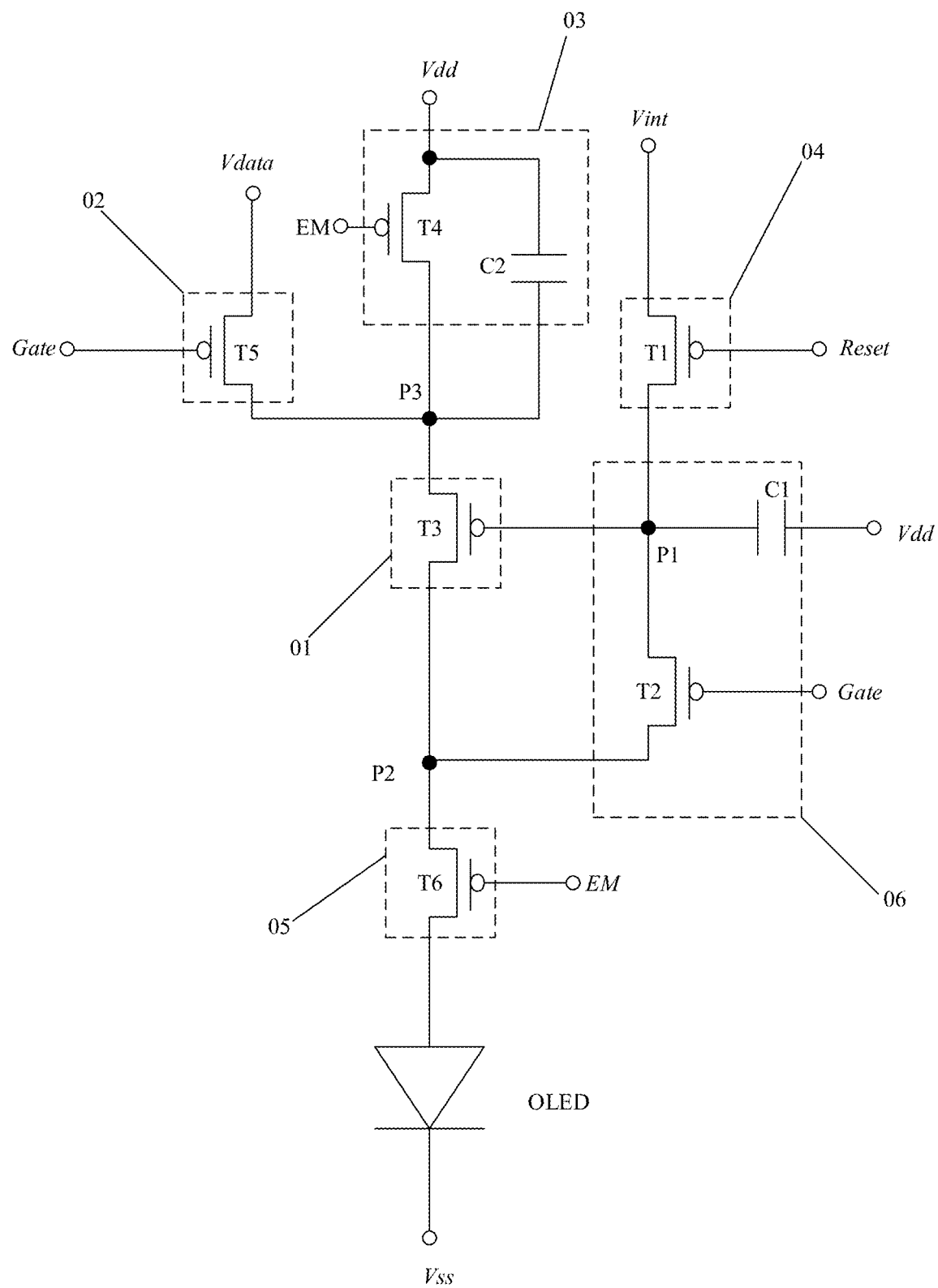
FIG. 2 is a schematic diagram showing a specific structure of a pixel circuit according to an embodiment of the present disclosure.

Referring to FIG. 2, in a touch panel provided by an embodiment of the present disclosure, the reset module includes a first switching transistor T1. A gate of the first switching transistor T1 is input with the reset signal Reset, a source of the first switching transistor T1 is input with the initialization signal Vint, and a drain of the first switching transistor T1 is connected to the first node P1. Specifically, the first switching transistor can be turned-on under control of the reset signal, and the turned-on first switching transistor can output the initialization signal to the first node so as to reset the first node, i.e., resetting the voltage at the first node as before.

Referring to FIG. 2, in a touch panel provided by an embodiment of the present disclosure, the compensator 06 may include a second switching transistor T2 and a first capacitor C1. A gate of the second switching transistor T2 is input with the scan signal Gate, a source of the second switching transistor T2 is connected to the second node P2, and a drain of the second switching transistor T2 is connected to the first node P1. A terminal of the first capacitor C1 is input with the power supply signal Vdd, and another terminal of the first capacitor C1 is connected to the first node P1. Specifically, the second switching transistor can be turned-on under control of the scan signal, and the turned-on second switching transistor can make the second node and the first node conducted, and meanwhile the first capacitor can adjust the potential at the first node by the power supply signal.

Referring to FIG. 2, in a touch panel provided by an embodiment of the present disclosure, the driver 01 may include a third switching transistor T3. A gate of the third switching transistor T3 is connected to the first node P1, a source of the third switching transistor T3 is connected to the third node P3, and a drain of the third switching transistor T3 is connected to the second node P2. Specifically, the third switching transistor can be turned-on under control of the first node, and the turned-on third switching transistor can make the second node and the third node conducted.

Referring to FIG. 2, in a touch panel provided by an embodiment of the present disclosure, the power supply includes a fourth switching transistor T4. A gate of the fourth switching transistor T4 is input with the light emitting control signal EM, a source of the fourth switching transistor T4 is input with the power supply signal Vdd, and a drain of the fourth switching transistor T4 is connected to the third node P3. Specifically, the fourth switching transistor T4 can be turned-on under control of the light emitting control signal, and the turned-on fourth switching transistor can output the power supply signal to the third node.

Figure 3:
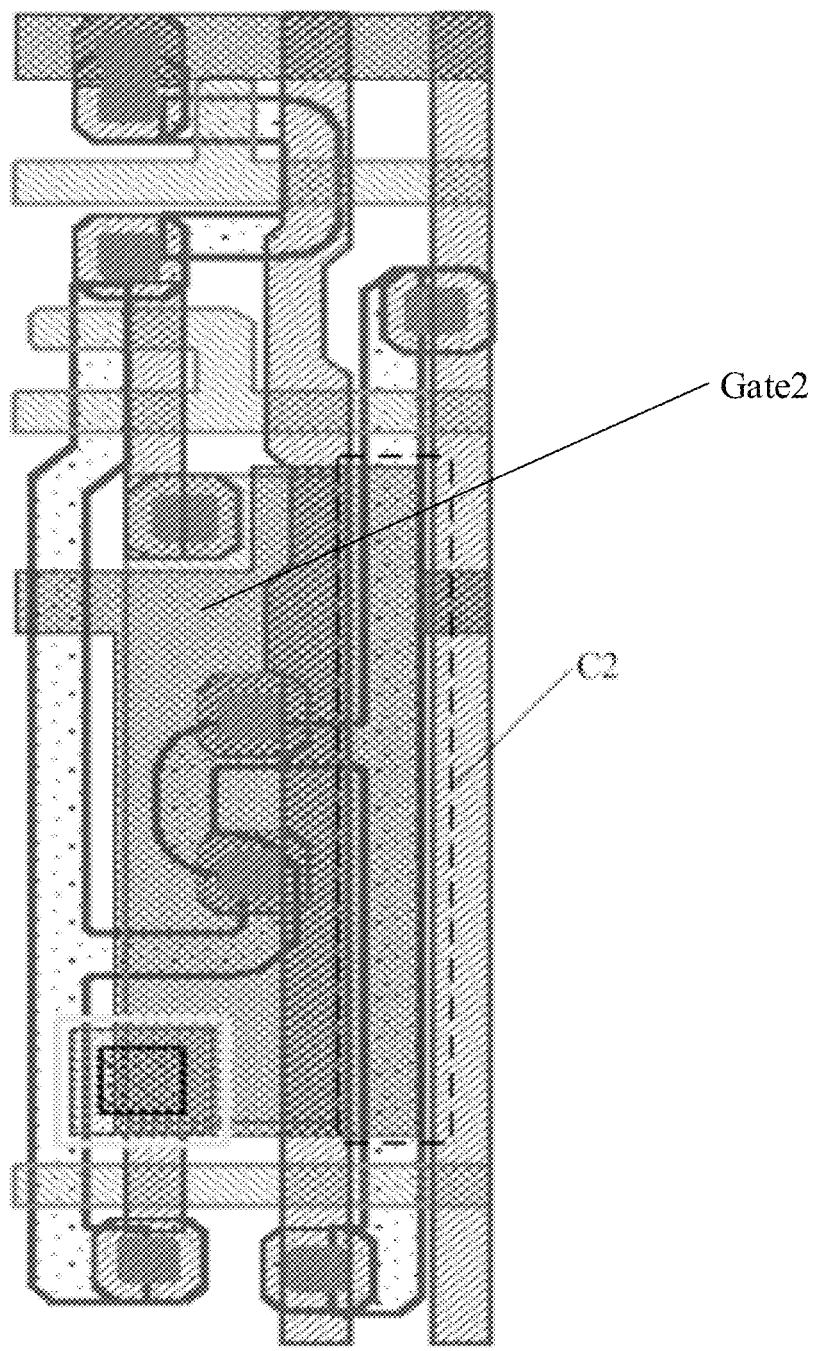
FIG. 3 is a schematic diagram showing a layout of a pixel circuit according to an embodiment of the present disclosure.
Figure 4:
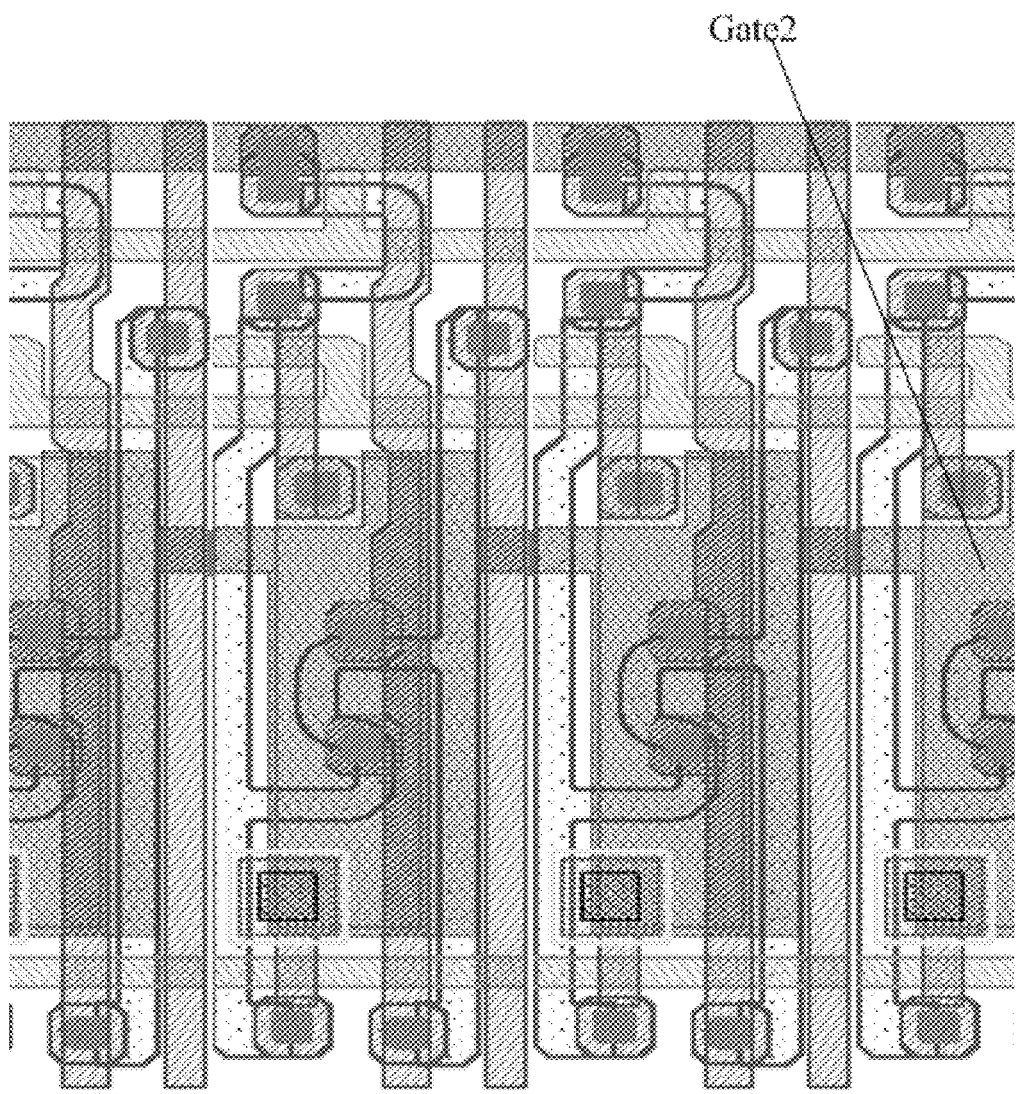
FIG. 4 is a schematic diagram showing a layout of a plurality of pixel circuits according to an embodiment of the present disclosure.

Referring to FIG. 2, in a touch panel provided by an embodiment of the present disclosure, the power supply 03 may further include a second capacitor C2. The second capacitor C2 is connected between the source and the drain of the fourth switching transistor T4. Specifically, referring to FIG. 3, a metal electrode Gate2 and an amorphous silicon layer form a capacitor (as indicated by the dotted box in FIG. 3), which is the second capacitor C2 in the pixel circuit. The second capacitor is connected between the source and the drain of the fourth switching transistor. When the potential at the gate of the third switching transistor (i.e., the driver transistor) is switched, the power supply signal Vdd will jitter. Because of the second capacitor C2, the signal at the source of the third switching transistor will jitter accordingly. This can ensure that, when there are changes in the potential at the gate of the third switching transistor, the signal at the source of the third switching transistor will jitter, too, thereby eliminating the influence of the voltage difference Vgs between the gate and the source of the third switching transistor on the output current. Consequently, the driver transistor can output reliable driving current, which is helpful for improving the display effect of the touch panel. Further, as shown in FIG. 4, the metal electrodes Gate2 on the whole surface are connected, and the connected electrodes are used for receiving the power supply signal Vdd. The modulation of the power supply signal Vdd directly applies on the metal electrodes Gate2, which forms a capacitor coupling with the ground power supply signal Vss which is received by the light emitting device. This can achieve better modulation effects and better touch control performance.

Referring to FIG. 2, in a touch panel provided by an embodiment of the present disclosure, the writer 02 may include a fifth switching transistor T5. A gate of the fifth switching transistor T5 is input with the scan signal Gate, a source of the fifth switching transistor T5 is input with the data signal Vdata, and a drain of the fifth switching transistor T5 is connected to the third node P3. Specifically, the fifth switching transistor can be turned-on under control of the scan signal, and the turned-on fifth switching transistor can output the data signal to the third node.

Referring to FIG. 2, in a touch panel provided by an embodiment of the present disclosure, the controller 05 includes a sixth switching transistor T6. A gate of the sixth switching transistor T6 is input with the light emitting control signal EM, a source of the sixth switching transistor T6 is connected to the second node P2, and a drain of the sixth switching transistor T6 outputs the driving signal for driving the light emitting device to emit light. Specifically, the sixth switching transistor can be turned on under control of the light emitting control signal, and the turned-on sixth switching transistor can output the signal at the second node to the light emitting device as the driving signal for driving the light emitting device to emit light.

It should be noted that the switching transistors and the driver transistor mentioned in the above embodiments of the present disclosure may be Thin Film Transistors (TFTs), or Metal Oxide Semiconductor Field Effect Transistors (MOSFET), and the present disclosure does not impose specific limitations on this. In practical implementations, the sources and drains of these transistors can be interchanged and no specific distinction is made. In the description of the specific embodiments, the thin film transistors are taken as an example for illustration.

Figure 5:
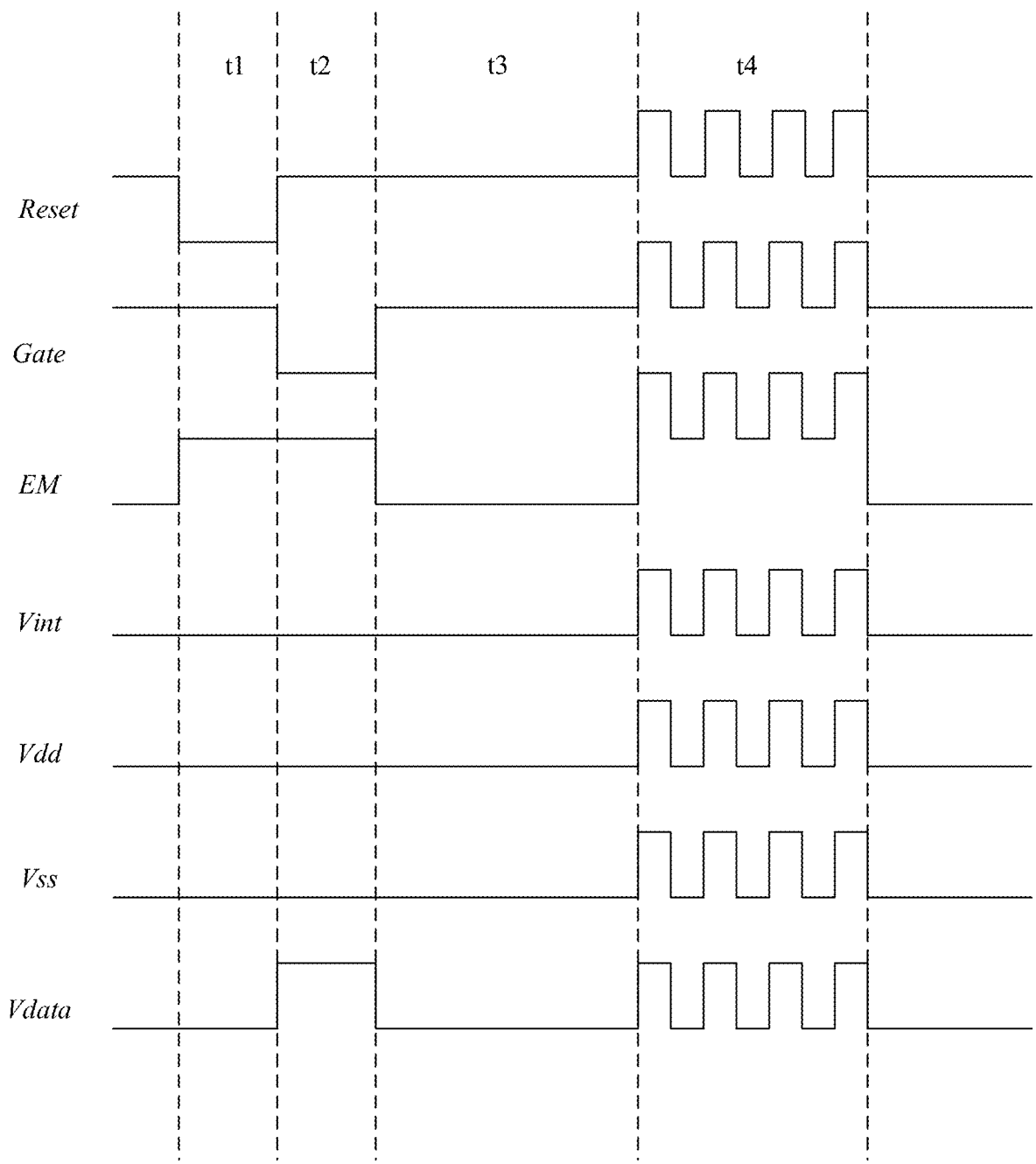
FIG. 5 shows operation timing of a pixel circuit according to an embodiment of the present disclosure.

The working process of the pixel circuits provided in the embodiments of the present disclosure will be described in detail below with reference to the pixel circuits and the working timing provided by the embodiments of the present disclosure. The working process of the pixel circuits provided by the embodiment of the present disclosure is described by using the pixel circuit shown in FIG. 2 and the working timing chart of the pixel circuits shown in FIG. 5. Specifically, four stages t1 to t4 in the input and output timing chart shown in FIG. 5 are selected. In the following description, 1 represents a high signal, and 0 represents a low signal.

In the stage t1, Reset=0, Gate=1, EM=1, Vint=0, Vdd=1, Vss=0, Vdata=0. Since Reset=00, the first switching transistor T1 is turned on (i.e., conducted); the turned-on first switching transistor T1 outputs the initialization signal Vint to the first node P1, and thus the potential at the first node P1 is reset to zero. The t1 stage is the reset stage.

In the stage t2, Reset=1, Gate=0, EM=1, Vint=0, Vdd=1, Vss=0, Vdata=1. Since Gate=0, the second switching transistor T2 and the fifth switching transistor T5 are turned on. At the same time, since the potential at the first node P1 is reset to 0 in the stage t1, the third switching transistor T3 (i.e., the driver transistor) is also turned on. The first node P1 is charged by the data signal Vdata through the turned-on fifth switching transistor T5, the third switching transistor T3, and the second switching transistor T2 until the potential at the first node P1 becomes Vdata−|Vth|, where Vth is the threshold voltage of the third switching transistor T3. In the charging process, since the potential at the right end of the first capacitor C1 is always the power supply signal Vdd, the potential at the first node P1 remains at Vdata−|Vth| after the charging is completed. In addition, because the sixth switching transistor T6 is turned off, the driving current does not pass through the light emitting device OLED, which is beneficial to reduce the lifetime loss of the light emitting device OLED. The stage t2 is the charging stage.

In the stage t3, Reset=1, Gate=1, EM=0, Vint=0, Vdd=1, Vss=0, Vdata=0. Since EM=0, the fourth switching transistor T4 and the sixth switching transistor T6 are turned on; the turned-on fourth switching transistor T4 outputs the power supply signal Vdd to the source of the third switching transistor T3 (i.e., the third node P3), the driving current for driving the light emitting device OLED to emit light passes through the turned-on fourth switching transistor T4, the third switching transistor T3, and the sixth switching transistor T6 to drive the light emitting device OLED to emit light. The following equation can be obtained by the saturation current equation of the third switching transistor:

$$I_{OLED} = K(V_{GS} - Vth)^2$$
$$= K[Vdd - (Vdata - |Vth|) - |Vth|]^2$$
$$= K(Vdd - Vdata)^2$$

where $I_{OLED}$ is a driving current for driving the light emitting device OLED to emit light, K is a constant related to a process parameter and a geometric size of the driver transistor (i.e., the third switching transistor), and Vgs is a voltage difference between the gate and the source of the driver transistor. It can be seen from the above equation that the operating current $I_{OLED}$ is not affected by the threshold voltage Vth and is only related to the power supply signal Vdd and the data signal Vdata. The problem of threshold voltage Vth drift caused by the manufacturing process and the long-time operation of the driver transistor can be avoided, the influence of the drift on the $I_{OLED}$ is eliminated, and the normal operation of the light emitting device OLED can ensured. The stage t3 is a light emitting stage. The stages t1~t3 can be collectively called as the display stage.

The stage t4 is a touch control stage. In this stage, touch control signals are applied to the cathodes through touch wires to realize touch control and driving. At the same time, signals which are the same and synchronized with the touch control signals are applied to the signal terminals of the pixel circuit. As shown in FIG. 5, the reset signal Reset, the scan signal Gate, the light emission control signal EM, the initialization signal Vint, the power signal Vdd, the ground power supply signal Vss, and the data signal Vdata are all modulated in synchronization with the touch signals applied on the touch electrodes, so that the influence of the coupling capacitance on the touch electrode can be counteracted, and meanwhile crosstalk can be minimized and the display effect of the touch panel can be improved.

Based on the same inventive concept, an embodiment of the present disclosure provides a touch screen which includes the touch panel provided by the embodiments of the present disclosure. The touch screen can be applied to any product or component having a display function, such as a mobile phone, a tablet computer, a television, a monitor, a notebook computer, a digital camera, a navigator, and the like. Since the principle of the touch screen to solve the problem is similar to that of the touch panel, the implementations of the touch screen may be found in the descriptions regarding the implementation of the touch panel as described above, and repeated descriptions are omitted here.

Embodiments of the present disclosure provide a touch panel and a touch screen. The touch panel includes a plurality of cathodes, touch wires and touch driving chips individually corresponding to one of the cathodes, and pixel circuits each disposed in one of pixel units, each of which includes a light emitting device having one of the cathodes. In a display stage, each of the pixel circuits is configured to drive the light emitting device to emit light normally under control of control signal terminals; and in a touch control stage, each of the touch driving chip is configured to apply a touch control signal to one of the cathodes through one of the touch wires, and apply a control signal which is the same as the touch control signal to the control signal terminals of one of the pixel circuit. In the embodiments of the present disclosure, the cathodes are reused. That is, in the touch control stage, each of the cathodes serves as a touch electrode, and normal display and touch functions of the touch panel can be realized by a time-division driving manner. Specifically, in the display stage, the pixel circuit controls the light emitting state of each pixel point (each pixel point has a light emitting device including a cathode); in the touch control stage, touch control signals are applied onto all control signal terminals of the pixel circuit and the cathodes at the same time. By doing so, on the basis that the touch control function can be realized, the synchronous driving of the touch control electrodes and the electrodes opposite to the touch control electrodes can be realized. This can eliminate the coupling voltage difference between electrodes and the touch control electrodes, and thereby counteract the influence of the coupling capacitance on the touch control electrodes and the influence of the touch electrodes on the load directly below the electrode.

It will be apparent to those skilled in the art that various modifications and variations can be made to the present disclosure without departing from the spirit and scope of the disclosure. Thus, if these modifications and variations of the present disclosure fall within the scope of the claims of the present disclosure and equivalent technologies the present disclosure is also intended to include these modifications and variations.

What is claimed is:
1. A touch panel, comprising:
   a plurality of cathodes;
   touch wires and touch driving chips individually corresponding to one of the cathodes; and pixel circuits each disposed in one of pixel units, each of which comprises a light emitting device having one of the cathodes;

wherein:

in a display stage, each of the pixel circuits is configured to drive the light emitting device to emit light normally under control of control signal terminals; and in a touch control stage, each of the touch driving chip is configured to apply a touch control signal to one of the cathodes through one of the touch wires, wherein each of the cathodes serves as a touch electrode, and apply control signals to the control signal terminals of one of the pixel circuit, wherein the control signals applied to the control signal terminals of one of the pixel circuit are modulated in the touch control stage and modulation of the control signals applied to the control signal terminals of one of the pixel circuit is synchronous with modulation of the touch control signal in the touch control stage, and the control signals applied to the control signal terminals comprises a reset signal, a scan signal, a light emission control signal, a initialization signal, a power signal, a ground power supply signal, and a data signal, wherein the display stage and the touch control stage do not overlap.

2. The touch panel of claim 1, wherein each of the pixel circuits comprises a driver, a writer, a power supply, a reset module, a controller and a compensator; wherein:

a control terminal of the reset module is input with the reset signal, an input terminal of the reset module is input with the initialization signal, and an output terminal of the reset module is connected to a first node; the reset module is configured to, under control of the reset signal, initialize the first node by the initialization signal;

a control terminal of the compensator is input with the scan signal, a first input terminal of the compensator is connected to a second node, a second input terminal of the compensator is input with a power supply signal, and an output terminal of the compensator is connected to the first node; the compensator is configured to, under control of the scan signal, compensate a threshold voltage at the first node;

a control terminal of the driver is connected to the first node, an input terminal of the driver is connected to a third node, and an output terminal of the driver is connected to the second node;

the driver is configured to, under control of the first node, make the third node and the second node conducted;

a control terminal of the power supply is input with a light emitting control signal, an input terminal of the power supply is input with the power supply signal, and an output terminal of the power supply is connected to the third node; the power supply is configured to, under control of the light emitting control signal, output the power supply signal to the third node;

a control terminal of the writer is input with the scan signal, an input terminal of the writer is input with the data signal, and an output terminal of the writer is connected to the third node; the writer is configured to, under control of the scan signal, output the data signal to the third node;

a control terminal of the controller is input with the light emitting control signal, an input terminal of the controller is connected to the second node, and an output terminal of the controller is configured to output a driving signal for driving the light emitting device to emit light; the controller is configured to, under control of the light emitting control signal, output a signal at the second node as the driving signal for driving the light emitting device to emit light.

3. The touch panel of claim 2, wherein the reset module comprises a first switching transistor;

wherein a gate of the first switching transistor is input with the reset signal, a source of the first switching transistor is input with the initialization signal, and a drain of the first switching transistor is connected to the first node.

4. The touch panel of claim 2, wherein the compensator comprises a second switching transistor and a first capacitor; wherein:

a gate of the second switching transistor is input with the scan signal, a source of the second switching transistor is connected to the second node, and a drain of the second switching transistor is connected to the first node; and a terminal of the first capacitor is input with the power supply signal, and another terminal of the first capacitor is connected to the first node.

5. The touch panel of claim 2, wherein the driver comprises a third switching transistor;

wherein a gate of the third switching transistor is connected to the first node, a source of the third switching transistor is connected to the third node, and a drain of the third switching transistor is connected to the second node.

6. The touch panel of claim 2, wherein the power supply comprises a fourth switching transistor;

wherein a gate of the fourth switching transistor is input with the light emitting control signal, a source of the fourth switching transistor is input with the power supply signal, and a drain of the fourth switching transistor is connected to the third node.

7. The touch panel of claim 6, wherein the power supply further comprises a second capacitor;

wherein the second capacitor is connected between the source and the drain of the fourth switching transistor.

8. The touch panel of claim 2, wherein the writer comprises a fifth switching transistor;

wherein a gate of the fifth switching transistor is input with the scan signal, a source of the fifth switching transistor is input with the data signal, and a drain of the fifth switching transistor is connected to the third node.

9. The touch panel of claim 2, wherein the controller comprises a sixth switching transistor;

wherein a gate of the sixth switching transistor is input with the light emission control signal, a source of the sixth switching transistor is connected to the second node, and a drain of the sixth switching transistor outputs the driving signal for driving the light emitting device to emit light.

10. A touch screen, comprising a touch panel;

wherein the touch panel comprises:

a plurality of cathodes;

touch wires and touch driving chips individually corresponding to one of the cathodes; and pixel circuits each disposed in one of pixel units, each of which comprises a light emitting device having one of the cathodes;

wherein:

in a display stage, each of the pixel circuits is configured to drive the light emitting device to emit light normally under control of control signal terminals; and in a touch control stage, each of the touch driving chip is configured to apply a touch control signal to one of the cathodes through one of the touch wires, wherein each of the cathodes serves as a touch electrode, and apply a control signal to the control signal terminals of one of the pixel circuit, wherein the control signals applied to the control signal terminals of one of the pixel circuit are modulated in the touch control stage and modulation of the control signals applied to the control signal terminals of one of the pixel circuit is synchronous with modulation of the touch control signal in the touch control stage, and the control signals applied to the control signal terminals comprises a reset signal, a scan signal, a light emission control signal, a initialization signal, a power signal, a ground power supply signal, and a data signal, wherein the display stage and the touch control stage do not overlap.

11. The touch screen of claim 10, wherein each of the pixel circuits comprises a driver, a writer, a power supply, a reset module, a controller and a compensator; wherein:

a control terminal of the reset module is input with the reset signal, an input terminal of the reset module is input with the initialization signal, and an input terminal of the reset module is connected to a first node; the reset module is configured to, under control of the reset signal, initialize the first node by the initialization signal;

a control terminal of the compensator is input with a scan signal, a first input terminal of the compensator is connected to a second node, a second input terminal of the compensator is input with the power supply signal, and an output terminal of the compensator is connected to the first node; the compensator is configured to, under control of the scan signal, compensate a threshold voltage at the first node;

a control terminal of the driver is connected to the first node, an input terminal of the driver is connected to a third node, and an output terminal of the driver is connected to the second node;

the driver is configured to, under control of the first node, make the third node and the second node conducted;

a control terminal of the power supply is input with a light emitting control signal, an input terminal of the power supply is input with the power supply signal, and an output terminal of the power supply is connected to the third node; the power supply is configured to, under control of the light emitting control signal, output the power supply signal to the third node;

a control terminal of the writer is input with the scan signal, an input terminal of the writer is input with the data signal, and an output terminal of the writer is connected to the third node; the writer is configured to, under control of the scan signal, output the data signal to the third node;

a control terminal of the controller is input with the light emitting control signal, an input terminal of the controller is connected to the second node, and an output terminal of the controller is configured to output a driving signal for driving the light emitting device to emit light; the controller is configured to, under control of the light emitting control signal, output a signal at the second node as the driving signal for driving the light emitting device to emit light.

12. The touch screen of claim 11, wherein the reset module comprises a first switching transistor;

wherein a gate of the first switching transistor is input with the reset signal, a source of the first switching transistor is input with the initialization signal, and a drain of the first switching transistor is connected to the first node.

13. The touch screen of claim 11, wherein the compensator comprises a second switching transistor and a first capacitor; wherein:

a gate of the second switching transistor is input with the scan signal, a source of the second switching transistor is connected to the second node, and a drain of the second switching transistor is connected to the first node; and a terminal of the first capacitor is input with the power supply signal, and another terminal of the first capacitor is connected to the first node.

14. The touch screen of claim 11, wherein the driver comprises a third switching transistor;

wherein a gate of the third switching transistor is connected to the first node, a source of the third switching transistor is connected to the third node, and a drain of the third switching transistor is connected to the second node.

15. The touch screen of claim 11, wherein the power supply comprises a fourth switching transistor;

a gate of the fourth switching transistor is input with the light emitting control signal, a source of the fourth switching transistor is input with the power supply signal, and a drain of the fourth switching transistor is connected to the third node.

16. The touch screen of claim 15, wherein the power supply further comprises a second capacitor;

wherein the second capacitor is connected between the source and the drain of the fourth switching transistor.

17. The touch screen of claim 11, wherein the writer comprises a fifth switching transistor;

wherein a gate of the fifth switching transistor is input with the scan signal, a source of the fifth switching transistor is input with the data signal, and a drain of the fifth switching transistor is connected to the third node.

18. The touch screen of claim 11, wherein the controller comprises a sixth switching transistor;

wherein a gate of the sixth switching transistor is input with the light emission control signal, a source of the sixth switching transistor is connected to the second node, and a drain of the sixth switching transistor outputs the driving signal for driving the light emitting device to emit light.

* * * * *